United States Patent Office 3,822,230
Patented July 2, 1974

3,822,230
COPOLYMERIC LATEXES MADE WATER-REDISPERSIBLE BY PRESENCE OF SIX-MEMBERED CARBOCYCLIC COMPOUND HAVING TWO VICINAL CARBOXYL SUBSTITUENTS
Alfred R. Nelson, Bay City, Mich., assignor to The Dow Chemical Company, Midland, Mich.
No Drawing. Continuation-in-part of application Ser. No. 234,319, Mar. 13, 1972. This application Jan. 22, 1973, Ser. No. 325,250
Int. Cl. C08f *15/40*
U.S. Cl. 260—29.6 H
20 Claims

ABSTRACT OF THE DISCLOSURE

Latex compositions, which after being dried are redispersible in water, comprise aqueous dispersions of film-forming carboxyl-containing polymers and a six-membered carbocyclic compound having two vicinal carboxyl substituents and which is soluble in aqueous alkaline media. The dried compositions after being redispersed in water provide reconstituted latexes which have approximately the same particle size as the original latex. Representative compositions are a blend of the disodium salt of 1,2,3,6-tetrahydrophthalic acid and a latex of a copolymer of styrene, butadiene and acrylic acid as well as dried films or dried powders obtained therefrom. The compositions are obtained by mixing the carbocyclic compound with the latex constituents either before, during or after preparation of the latex or are obtained by in situ formation of the carbocyclic compound during emulsion polymerization.

CROSS-REFERENCES TO RELATED APPLICATIONS

This application is a continuation-in-part of application Ser. No. 234,319 filed Mar. 13, 1972, now abandoned.

BACKGROUND OF THE INVENTION

(1) Field of the Invention

The present invention is concerned with latexes of film-forming polymers which when dried are redispersible in water to yield latex compositions having approximately the same particle size as the original latex composition and is concerned with films and powders obtained from such latexes.

(2) Description of the Prior Art

Because of the potential for saving in shipping costs, there has been interest for some time in latex polymer systems which contain a minimum amount of water. United States Pat. No. 3,232,899, which issued to Leonard F. Guziak, Feb. 1, 1966, describes a reconstitutable latex of a polymer which contains from 15 to 40 parts of an interpolymerized ethylenically unsaturated acid, preferably acrylic acid or methacrylic acid. The polymers described, however, are not film forming. While a coalescing agent may be added to the reconstituted latex of that patent to provide film-formation, the patent discloses that by such treatment the polymer has lost any tendency to be reconstituted.

In United States Pat. No. 3,409,578, issued Nov. 5, 1968, to Jesse C. H. Hwa, there is disclosed the preparation of dry, particulate, water-insoluble, film-forming or non-film-forming polymers adapted to be dispersed directly in water by adding to a latex, which must contain carboxylate groups, a surface-hardening metal ion to form a "skin" around the polymer particles which prevents fusion of the particles together on drying. In order to redisperse the polymer particles to produce a latex having a particle-size about the same as the original latex, it is necessary to add a material which withdraws the surface-hardening metal ion either through formation of an insoluble salt or the formation of a complex ion therewith.

SUMMARY OF THE INVENTION

The present invention provides a latex composition having an average particle diameter from about 500 Angstroms to about 10,000 Angstroms, preferably from about 1500 Angstroms to about 4,000 Angstroms, which can be deposited as a film and dried or can be spray dried to form a powdery product and such dried films or powders are dispersible in water to form a reconstituted latex having approximately the same particle size as the original latex.

The latex composition comprises an aqueous colloidal dispersion of a film-forming copolymer of from about 1 percent to about 10 percent, preferably from about 3 percent to about 5 percent, of an $\alpha,\beta$-ethylenically unsaturated carboxylic acid and the balance of an essentially water-insoluble, ethylenically unsaturated monomeric composition and a six-membered carbocyclic compound having two vicinal carboxyl substituents which is soluble in aqueous alkaline media, in an amount effective to provide water-redispersibility of the copolymer residue obtained by drying the latex. The latex compositions may be obtained by the additive method, i.e., by mixing the six-membered-ring carbocyclic compound with film forming latexes having a polymeric component containing the required amount of copolymerized ethylenically unsaturated carboxylic acid or they may be obtained by the in situ method wherein certain of the carbocyclic compounds can be formed in situ during emulsion polymerization of monomeric compositions (which must include an aliphatic conjugated diene) to prepare the latex. In the in situ preparation, from about 2.5 percent to about 13 percent, preferably from about 4 percent to about 8 percent, of fumaric acid or of a monomethyl, monoethyl or monopropyl ester of an $\alpha,\beta$-ethylenically unsaturated dicarboxylic acid, from about 20 percent to 97.5 percent, preferably from about 30 percent to about 75 percent, and especially greater than about 35 percent of an aliphatic conjugated diene and the balance of another copolymerizable, neutral, ethylenically unsaturated monomer are subjected to emulsion polymerization conditions at an acid pH.

To form a redispersible dry product, sufficient water-soluble base-acting compound is added to the latex product to provide a pH of from about 7 to about 14, preferably from about 8 to about 12, then the resulting product is dried such as by freeze-drying, by spray-drying, or by casting a wet film and allowing that film to dry at ambient temperature or at a temperature below about 95° C., preferably below about 60° C.

DESCRIPTION OF THE PREFERRED EMBODIMENTS

The compositions of the present invention contain a mixture of a film-forming copolymer and a six-membered carbocyclic compound having two vicinal carboxyl substituents which is soluble in aqueous alkaline media and are prepared either by the addition of such a soluble carbocyclic compound to a preformed latex or by the in situ preparation of the carbocyclic compound and the copolymer comprising the latex by an emulsion polymerization process. For brevity, the methods are sometimes referred to hereinafter as the "additive method" when the carbocyclic compound per se is added either before, during, or after polymerizing the monomeric components of the latex and as the "in situ method" when the carbocyclic compound is formed during emulsion polymerization.

The six-membered carbocyclic compounds having two vicinal carboxyl substituents, i.e., compounds containing a ring composed of six carbon atoms having one carboxyl group attached to each of two adjacent ring-carbon atoms, are phthalic acid (ortho-phthalic acid) and modified phthalic acid compounds which are soluble in aqueous alkaline media, i.e., in an aqueous solution containing sufficient water-soluble base to maintain a pH greater than 7 and less than about 14. The term "six-membered" refers only to the number of carbon atoms in the carbocyclic ring. By the word "modified" in the term "modified phthalic acid compounds" is meant substitution of other substituents such as alkyl or halogen for hydrogens on ring-carbon atoms and/or different degrees of double-bond unsaturation of the carbocyclic ring; for example, phthalic acid per se is completely unsaturated, hexahydrophthalic acid is completely saturated whereas 1,2,3,6-tetrahydrophthalic acid and 1,3-cyclohexadiene-1,2-dicarboxylic acid have an intermediate degree of saturation. The six-membered carbocyclic compounds having two vicinal carboxyl substituents which are soluble in aqueous alkaline media are represented by phthalic acid,
3-methylphthalic acid,
4-methylphthalic acid,
4-methoxyphthalic acid,
3,4-dimethylphthalic acid,
3,4-dimethoxyphthalic acid,
3,4-dimethoxy-6-nitrophthalic acid,
4-methoxy-3,6-dimethylphthalic acid,
4,5-dimethoxyphthalic acid,
4,5-diethoxyphthalic acid,
4-chloro-5-methoxyphthalic acid,
3,6-difluorophthalic acid,
tetrachlorophthalic acid,
tetrabromophthalic acid,
3-bromo-4-ethoxy-5-methoxyphthalic acid,
3-phenylphthalic acid,
4-benzylphthalic acid,
1,3-cyclohexadiene-1,2-dicarboxylic acid,
1,4-cyclohexadiene-1,2-dicarboxylic acid,
3-methyl-1,4-cyclohexadiene-1,2-dicarboxylic acid,
3-methyl-4,6-cyclohexadiene-1,2-dicarboxylic acid,
3-methyl-3,6-cyclohexadiene-1,2-dicarboxylic acid,
4-methyl-1,4-cyclohexadiene-1,2-dicarboxylic acid,
5-methyl-2,4-cyclohexadiene-1,2-dicarboxylic acid,
3,4-dimethyl-1,4-cyclohexadiene-1,2-dicarboxylic acid,
3,4-dimethyl-4,6-cyclohexadiene-1,2-dicarboxylic acid,
1,2,3,6-tetrahydrophthalic acid, and
hexahydrophthalic acid.

In the additive method of preparation wherein the carbocyclic compound, as heretofore defined, is mixed with a pre-formed latex, there are many known latexes which are suitable in the practice of the invention. It is required that such latexes contain a copolymer of from about 1 percent to about 10 percent of an $\alpha,\beta$-ethylenically unsaturated carboxylic acid and a substantially water-soluble ethylenically unsaturated monomeric composition wherein the copolymer is film-forming at temperatures below about 95° C., preferably below about 30° C., and has a particle size within the range of from about 500 Angstroms to about 10,000 Angstroms.

The $\alpha,\beta$-ethylenically unsaturated carboxylic acids may be monocarboxylic or polycarboxylic and ordinarily have from 3 to 6 carbon atoms although acids having a greater number of carbon atoms such as up to 10 may be used. Representative of the unsaturated monocarboxylic acids are acrylic acid, methacrylic acid, ethacrylic acid, crotonic acid, sorbic acid, hydrosorbic acid and cinnamic acid. Representative of unsaturated polycarboxylic acids are maleic acid, fumaric acid, itaconic acid, citraconic acid, mesaconic acid and aconitic acid.

The ethylenically unsaturated monomeric composition which is copolymerized with such unsaturated acids in the pre-formed latexes includes one or more monoethylenically unsaturated, copolymerizable monomers which form hydrophobic polymers and/or an aliphatic conjugated diene.

The copolymerizable, ethylenically unsaturated compounds which as homopolymers or as copolymers with each other are hydrophobic are represented by, but not restricted to, non-ionic monoethylenically unsaturated monomers such as the alkenyl aromatic compounds, i.e., the styrene compounds, the derivatives of $\alpha$-methylene monocarboxylic acids such as the acrylic esters, acrylic nitriles and methacrylic esters; derivatives of $\alpha,\beta$-ethylenically unsaturated dicarboxylic acids such as maleic diesters; unsaturated alcohol esters; unsaturated ketones; unsaturated ethers; and other polymerizable vinylidene compounds such as vinyl chloride and vinylidene chloride. Specific examples of such ethylenically unsaturated compounds are styrene, $\alpha$-methylstyrene, ar-methylstyrene, ar-ethylstyrene, $\alpha$,ar-dimethylstyrene, ar,ar-dimethylstyrene, ar,ar-diethylstyrene, t-butylstyrene, vinylnaphthalene, hydroxystyrene, methoxystyrene, cyanostyrene, acetylstyrene, monochlorostyrene, dichlorostyrene, and other halostyrenes, methyl methacrylate, ethyl acrylate, butyl acrylate, hexyl acrylate, 2-ethylhexyl acrylate, lauryl methacrylate, phenyl acrylate, 2-hydroxybutyl acrylate, 2-hydroxybutyl methacrylate, 4-hydroxybutyl acrylate, and 4-hydroxybutyl methacrylate; acrylonitrile, methacrylonitrile, acryloanilide, ethyl $\alpha$-chloroacrylate, diethyl maleate, dimethyl fumarate, diethyl itaconate, vinyl acetate, vinyl propionate, vinyl chloride, vinyl bromide, vinylidene chloride, vinylidene fluoride, vinyl methyl ketone, methyl isopropenyl ketone, and vinyl ethyl ether.

By the term "aliphatic conjugated diene" it is meant to include, typically, 1,3-butadiene, 2-methyl-1,3-butadiene, 2,3-dimethyl-1,3-butadiene, piperylene, 2-neopentyl-1,3-butadiene, and other hydrocarbon homologs of 1,3-butadiene, and, in addition, the substituted dienes, such as 2-chloro-1,3-butadiene, 2-cyano-1,3-butadiene, the substituted straight-chain conjugated pentadienes, the straight and branched-chain hexadienes, and the like. Usually the conjugated dienes have from 4 to 10 carbon atoms. The 1,3-butadiene hydrocarbons, and 1,3-butadiene and isoprene specifically, because of their ability to produce particularly desirable polymeric material, are preferred.

The aqueous dispersions used in the practice of this invention are conveniently prepared from the above-described monomers by conventional emulsion polymerization at acid pH using small amounts of conventional emulsifiers and free-radical producing catalysts usually in an amount from about 0.01 percent to about 3 percent based on the weight of the monomers under conventional conditions of agitation, time, pressure, and temperature, using either a batchwise, incremental or continuous type addition of the monomers, water and other constituents to a reaction vessel or to a series of such vessels or by polymerization in a coil reactor.

The catalysts are of the type which produce free radicals and conveniently are per-oxygen compounds; for example, the inorganic persulfate compounds such as sodium persulfate, potassium persulfate and ammonium persulfate; the inorganic peroxides such as hydrogen peroxide; the organic hydroperoxides such as cumene hydroperoxide and t-butyl hydroperoxide; the organic peroxides such as benzoyl peroxide, acetyl peroxide, lauroyl peroxide, peracetic acid and perbenzoic acid—sometimes activated by water-soluble reducing agents such as a ferrous compound, sodium bisulfite or hydroxylamine hydrochloride—and other free radical producing materials such as 2,2'-azobisisobutyronitrile.

Emulsifiers, although not required for the invention, are often advantageously included in the aqueous dispersion for stabilization of the dispersion and/or to provide particle size control. Usually at least one anionic emulsifier is included and one or more of the known non-ionic emulsifiers may also be present. Representative types of anionic emulsifiers are the alkyl aryl sulfonates, the alkali metal alkyl sulfates, the sulfonated alkyl esters, the fatty acid soaps and the like. Specific examples of these well known emulsifiers, for the purpose of illustration and not for limitation, are dodecylbenzene sodium sulfonate, sodium butyl naphthalene sulfonate, sodium lauryl sulfate, di-sodium dodecyldiphenyl ether disulfonate, n-octadecyl disodium sulfosuccinate and dioctyl sodium sulfosuccinate. Other species of useful anionic emulsifying agents will be known. Typical non-ionic emulsifiers (surfactants) are compounds formed by the reaction of an alkylene oxide, such as ethylene oxide, propylene oxide, or butylene oxide with long chain fatty alcohols, long chain fatty acids, alkylated phenols, and long chain alkyl mercaptans; the alkylene oxides being reacted in a ratio such as 5 moles to 20 moles or higher such as up to 50 moles per mole of the coreactant. Similarly effective compounds are monoesters such as the reaction products of a polyethylene glycol with long chain fatty acids, for example, glycerol monostearate, sorbitan trioleate, and partial and complete esters of long chain carboxylic acids with polyglycol ethers of polyhydric alcohols. By "long chain" in the above description usually is meant an aliphatic group having from six carbon atoms to 20 or more. Combinations of two or more emulsifying agents from one or more of the classes may be employed if desired for special effects.

The amount of emulsifier during polymerization usually is from about 0.05 part to about 5 parts preferably from about 0.5 part to about 3 parts, for each 100 parts of monomers on a weight basis.

Sometimes part or all of these surfactants are introduced into the polymerization mixtures as a component of a preformed seed latex. In such a process, to small amounts of a seed latex are added water, constituent monomers, the free-radical producing catalysts and any other ingredients of the emulsion polymerization recipe in an incremental or a continuous manner while maintaining agitation of the contents of the polymerization zone under conditions of pressure suitable for the monomeric composition being used and at a temperature suitable for the particular catalyst system being used, such temperatures usually being between about 0° C. and 115° C.

Conventional additives for latex compositions may be included in small but usual amounts and in a known manner. Such materials include, but are not restricted to, chain transfer agents, short stopping agents, buffers, antifoaming agents, chelating agents, inorganic salts, additional surfactants, plasticizers, tinting materials, bactericides, or other preservatives and the like.

The aqueous dispersions, i.e., the latex compositions, usually are prepared at a solids content of from about 30 percent to about 70 percent, preferably from about 40 percent to about 55 percent by weight.

The additive method also encompasses embodiments in which the carbocyclic compound is added to other constituents of the composition before or during emulsion polymerization of the monomers to form the latex.

The amount of the carbocyclic compound which is effective to provide water-redispersibility usually is from about 1 part to about 10 parts, preferably from about 2 parts to about 8 parts, for each 100 parts of copolymer in the latex. Ordinarily the minimum proportion of carbocyclic compound would not be used with a latex containing the minimum amount of copolymerized carboxyl-containing monomer or with a latex having an average particle size near the smaller end of the particle-size range. The carbocyclic compound can be added either as the acid or as a water-soluble salt of the acid. However, when the pH of the latex is adjusted above 7 as described below, the carbocyclic compound will be, at least partially, in the water-soluble salt form.

The alternate *in situ* method of preparing compositions of this invention comprises the emulsion polymerization of the same kinds of monomers as noted above except that the aliphatic conjugated diene which is optional in the preparation of the pre-formed latex is a requirement in the in situ method and there is also required fumaric acid or a water-soluble monoalkyl ester of an ethylenically unsaturated dicarboxylic acid having from 4 to 5 carbon atoms. The monoalkyl esters are represented by the monomethyl, monoethyl and monopropyl esters of maleic acid, fumaric acid, itaconic acid and citraconic acid but the monomethyl esters are preferred and the especially preferred ester is monomethyl maleate. The amounts of the various components of the monomeric composition are from about 20 percent to about 97.5 percent, preferably from about 30 percent to about 60 percent, of the aliphatic conjugated diene, from about 2.5 percent to about 13 percent, preferably from about 4 percent to about 8 percent, of fumaric acid or of the monoalkyl ester, from 0 to about 77.5 percent, preferably from about 32 percent to about 66 percent, of a non-ionic monoethylenically unsaturated monomer and from 0 to about 8 percent of another $\alpha,\beta$-ethylenically unsaturated carboxylic acid, provided that the total amount of ethylenically unsaturated carboxyl-containing monomer is not greater than about 13 percent. The minimum amount of monoalkyl ester or fumaric acid ordinarily would be used only with the monomethyl esters, when another $\alpha,\beta$-ethylenically unsaturated carboxylic acid is also used or when polymerization conditions are chosen such that a large particle-sized latex is produced. Similarly, when the monethyl, and especially the monopropyl, esters are used, the amount should be selected from the upper part of the range.

In the in situ method the prescribed monomers are polymerized under conventional emulsion polymerization conditions at acid pH and optionally with conventional added materials as summarized above. However, best results are obtained when the polymerization is carried out in a sequential manner such that the fumaric acid or alkyl monoester is present in the initial composition before polymerization conditions are generated, together with not more than about 80 percent of the aqueous phase and optionally with a small amount of seed latex, then the other monomeric constituents and the remainder of the aqueous phase together with the catalyst are added as separate streams either incrementally or continuously until all of the constituents have been added.

During the emulsion polymerization process, some of the monoalkyl ester is copolymerized with the other monomeric constituents and some of its reacts with the conjugated diene and hydrolysis occurs to form a tetrahydrophthalic acid. Thus, there is obtained a latex of a carboxyl-containing polymer in admixture with a six-membered carbocyclic compound having two vicinal carboxyl substituents. It appears that when a half ester of itaconic acid is used, a rearrangement occurs such that some of the same kind of product is obtained, i.e., a carbocyclic compound having carboxyl groups attached directly to adjacent ring-carbon atoms.

While the latex products of this invention may be used for a wide variety of purposes, they are particularly desirable for use in the preparation of non-woven products and for use in coatings.

The latex products may be converted to dry compositions (which are redispersible in water to reform latex products having about the same particle size as the original latex) in several ways. For example, the latex composition may be cast on a suitable surface such as glass and allowed to dry at ambient temperature or at higher temperatures but less than 95° C., preferably not exceeding 60° C. Powdery products can be obtained by spray-drying or freeze-drying techniques. However, for good redispersibility the latex composition should have a pH value from about 7 to about 14, preferably from about 8 to about 12. If the pH of the composition is lower than about 7, sufficient water-soluble base should be added, before drying, to raise the pH to the desired value. Any of the water-soluble organic or inorganic base-acting compounds may be used such as the lower molecular weight amines, for example, methyl amine, ethyl amine, n-propyl amine, n-butyl amine, n-amyl amine and 2-aminoethanol; and the ammonium or alkali metal hydroxides such as ammonium hydroxide, lithium hydroxide, sodium hydroxide and potassium hydroxide. To assure continued redispersibility the dried products should not be heated above about 95° C.

Specific end-use products may be prepared by processes which start with the products of the invention in the latex form as prepared; for example, as binders in the manufacture of non-woven products. Provided such dry products of the invention in the dry state such as an additive simplified because of the redisperible nature of the binder. Other end-use materials may be prepared using the products of the invention in the dry state such as an additive to patching plaster, or to tape joint filler. In addition, the latex products may be converted to the dry form for subsequent shipping and storage, with eventual use either in that form or combined with water as a reconstituted latex.

A simple test for redispersibility is described as follows: A wet film, about 15 mils in thickness, is cast on a glass plate and allowed to dry to a clear, continuous film. The dry film on the glass plate is held under a deionized water tap which is turned on only enough to give a small continuous stream of water. The degree of dispersibility is then rated as: Type I, spontaneously redisperses to a latex having a particle size about the same as the original latex even when the dry film has been aged for more than one day; Type II, spontaneously disperses in water to give a particle size somewhat larger than the original latex when the dry film has aged for up to about one day but requires light rubbing thereafter; and Type III, redisperses in water only with light rubbing to give a particle size considerably larger than the original latex. A latex which does not show sufficient redispersibility to meet at least the requirements of Type III is classified as none.

The following examples are given to illustrate more clearly the principle and practice of this invention to those skilled in the art and are not for purposes of limitation.

Throughout the specification and claims, all parts and percentages are by weight unless otherwise indicated. The particle sizes are measured by light scattering with the Brice-Phoenix Photometer.

Examples 1–14

The data for Examples 1–9 are summarized below in Table I and for Examples 10–14 in Table II. The starting latex, having a polymeric composition as identified for each sample, has a polymer solids content between 35 percent and 55 percent and contains a small amount of an anionic or non-ionic surfactant. The latex of Example 14 and comparative latex 14c contain a non-ionic surfactant, nonyl phenol polyethylene glycol. The other latexes contain small amounts of anionic surfactants of various types such as sodium lauryl sulfate and the disodium salt of dodecyldiphenyl ether disulfonic acid. For each example, the latex is stirred, the carbocyclic compound is added as an aqueous alkaline solution and stirring is continued for about 5 minutes. The resulting compositions are tested for redispersibility according to the test described above and the redispersibility type and particle size are as listed in Tables I and II.

TABLE I [a]

| Example number | Latex description | | | | | | | Mixture | | Redispersed polymer | |
|---|---|---|---|---|---|---|---|---|---|---|---|
| | Copolymerized non-ionic monomers | | Acidic monomer | | | Carbocyclic compound | | | | | |
| | S | B | Kind | Amt. | pH | Kind | Parts | pH | Particle size, angstroms | Type | Particle size, angstroms |
| 1 | 57 | 40 | IA | 3 | 8.1 | Na THP | 4 | 8.9 | 1,820 | I | 1,840 |
| 2 | 58 | 40 | FA | 2 | 7.0 | Na THP | 4 | 11.0 | 1,790 | I | 1,800 |
| 3 | 62 | 36 | AA | 2 | 8.0 | Na THP | 4 | 11.0 | 1,650 | I | 1,650 |
| 4 | 63 | 36 | IA | 1 | 7.0 | Na THP | 4 | 11.0 | 1,500 | II | 2,350 |
| 4c* | 60 | 40 | None | | 8.0 | Na THP | 4 | 11.5 | 1,850 | None | |
| 5 | 61 | 37 | FA | 2 | 7.0 | Na o-P | 3 | 11.0 | 1,520 | I | 1,550 |
| 6 | 58 | 39 | IA | 3 | 8.6 | Na HHP | 5 | 10.0 | 1,900 | I | 1,900 |
| 7 | 57 | 40 | IA | 3 | 8.0 | Na TClP | 3 | 8.0 | 1,800 | I | 1,800 |
| 8 | 57 | 40 | IA | 3 | 8.0 | Na TBrP | 3 | 8.0 | 1,800 | I | 1,800 |
| 9 | 57 | 40 | IA | 3 | 8.0 | Na 4-MeP | 3 | 8.0 | 1,800 | I | 1,800 |

[a] See the list of abbreviations after Table III.
*Not examples of the invention.

TABLE II [a]

| Ex. No. | Latex description | | | | | | | | | Mixture | | Redispersed polymer | |
|---|---|---|---|---|---|---|---|---|---|---|---|---|---|
| | Copolymerized non-ionic monomers | | | | | | Acidic monomer | | | Carbocyclic compound | | | |
| | VeCl₂ | MA | VAc | VCN | EA | VCl | Kind | Amt. | pH | Kind | Parts | pH | Particle size, angstroms | Type | Particle size, angstroms |
| 10 | 78 | 18 | | | | | AA | 4 | 5.0 | Li THP | 1 | 9.0 | 1,530 | II | 2,040 |
| 11 | | | | 96 | | | AA | 4 | 3.6 | Li THP | 10 | 9.1 | 1,500 | I | 1,500 |
| 12 | 78 | 18 | | | | | AA | 4 | 5.0 | Li THP | 5 | 9.5 | 1,520 | I | 1,520 |
| 13 | 78 | | | | 8 | 10 | AA | 4 | 6.0 | Na THP | 4 | 10.0 | 1,650 | I | 1,660 |
| 14 | | 18 | 78 | | | | MMM | 4 | 7.5 | Li THP | 5 | 10.0 | 2,300 | I | 2,300 |
| 14c* | | 18 | 78 | | | | MMM | 4 | 10.0 | None | | 10.0 | 2,300 | None | |

[a] See the list of abbreviations after TABLE III.
*Not examples of the invention.

In a comparative experiment, when 3 parts of a carbocyclic compound which is insoluble in aqueous alkaline media, i.e., tetraphenylphthalic acid, is substituted for the sodium tetrahydrophthalate of Example 1, it is found that the product obtained is not redispersible.

Examples 15–25

In these examples (except as noted in Table III), into a stirred, 3-liter glass pressure reactor are placed 55 parts of deionized water, 0.02 part of the trisodium salt of N-hydroxyethylene-diamine-triacetic acid, 0.10 part of the sodium salt of dodecyldiphenyl ether disulfonic acid, the amount indicated in Table III of the specified monoalkyl ester of a dicarboxylic acid and 1.65 parts of a seed latex containing 20 percent by weight of a copolymer having an average particle size of 200 Angstroms consisting of 50 percent of styrene and 50 percent of methyl methacrylate and also containing 15 percent (based on the weight of the copolymer) of sodium lauryl sulfate. The contents of the reactor are heated to 90° C. and are maintained at that temperature during the process. A first, separately-prepared, aqueous solution of 0.02 part of N-hydroxyethylethylene-diamine triacetic acid, 0.5 part of the sodium salt of dodecyldiphenyl ether disulfonic acid, 0.2 part of sodium hydroxide and 0.5 part of sodium persulfate in 45 parts of deionized water is added in a continuous manner over a period of 4½ hours. Starting at the same time as the first aqueous continuous stream there is added in a continuous manner over a period of 4 hours a monomer stream containing the monomers as listed in Table III and 1 part of bromoform. The reaction mixture is stirred for an additional three hours at 90° C. after the last of the components are added. Stable latex products are obtained thereby having an acid pH and the particle sizes indicated in Table III. To portions of the latex products is added sufficient sodium hydroxide to raise the pH to about 8 and the redispersibility according to the test described above is found to be as indicated in Table III.

Sodium hydroxide is added to other portions of the latex product according to Example 19 to raise the pH above 8. Such material from one portion is spray dried to obtain a dry powder and another portion is freeze dried. An equivalent amount of water is added to the dried material with moderate stirring to obtain latexes having 50 percent solids. The particle size for each reconstituted latex is found to be about 2200 Angstroms.

The presence of 1,2,3,6-terthydrophthalic acid in Examples 15–25 is confirmed by nuclear magnetic resonance. In this analysis, a portion of the latex is diluted with water to 20 percent solids. The diluted latex is centrifuged and the serum obtained therefrom is filtered through a Millipore filter, Model XX 424700, membrane No. PSWP 04710, (Millipore Corporation, Bedford, Mass.) to remove materials having a molecular weight greater than about 1000. A 10-milliliter portion of the filtrate thus obtained is dried under flowing nitrogen at room temperature and the dried residue is redissolved in 1 milliliter of deuterium oxide which contains 3 percent of an internal chemical shift reference (sodium 3-trimethylsilylpropionate-2,2,3,3-d4) and the nuclear magnetic resonance spectra at 60 megahertz and 260 megahertz is recorded. A small amount of a compound known to be 1,2,3,6-tetrahydrophthalic acid is added, the nuclear magnetic resonance spectra is again recorded and superposition of the pertinent absorption peaks is seen at a higher amplitude but no new distinct absorption peaks are evident.

VCN=Acrylonitrile
IA=Itaconic acid
FA=Fumaric acid
AA=Acrylic acid
Na THP=Disodium salt of 1,2,3,6-tetrahydrophthalic acid
Na o-P=Disodium salt of o-phthalic acid
Na TClP=Disodium salt of tetrachloro-o-phthalic acid
Na TBrP=Disodium salt of tetrabromo-o-phthalic acid
Na 4-MeP=Disodium salt of 4-methyl-o-phthalic acid
Na HHP=Disodium salt of hexahydrophthalic acid
Li THP=Dilithium salt of 1,2,3,6-tetrahydrophthalic acid
MMM=Monomethyl maleate (methyl acid maleate)
MEM=Monoethyl maleate
MPM=Monopropyl maleate
MBM=Monobutyl maleate
MMI=Monomethyl itaconate

EXAMPLE 26

A latex is prepared as described in Examples 15–25 except that, instead of the alkyl monoester, there is used 3 parts of 1,2,3,6-tetrahydrophthalic acid and the monomeric constituents are 49 parts of styrene, 45 parts of butadiene and 3 parts of itaconic acid. The product is an acidic latex having a particle size of 1900 Angstroms. In the redispersibility test, the latex product is found to be redispersible, Type I, and the particle size of the reconstituted latex is 1900 Angstroms.

In a comparative test, a similar latex prepared in the same manner but without the tetrahydrophthalic acid, i.e., prepared from 52 parts of styrene, 45 parts of butadiene and 3 parts of itaconic acid, is found not to be redispersible. In another comparative test, a similar latex prepared in the same manner but without the itaconic acid, i.e., prepared from 52 parts of styrene, 45 parts of butadiene and 3 parts of 1,2,3,6-tetrahydrophthalic acid, is also found not to be redispersible.

What is claimed is:

1. A film-forming latex composition having an average particle diameter of from about 500 Angstroms to about 10,000 Angstroms which when dried at a pH greater than about 7 is redispersible in water to form a latex having substantially the same particle diameter as the original latex, said latex composition comprising an aqueous dispersion of particles of a copolymer of from about 1 percent to about 10 percent of an α,β-ethylenically unsaturated carboxylic acid and the balance of a polymerizable, essentially water-insoluble, ethylenically unsaturated monomeric composition and an effective amount to provide water-redispersibility of a six-membered carboxylic compound having two vicinal carboxyl substituents which is soluble in aqueous alkaline media; said copolymer being film-forming at temperatures below about 95° C.

TABLE III

| Ex. No. | Monomers polymerized | | | | Alkyl monoester | | Product, particle size, angstroms | Redispersed material | | Remarks |
|---|---|---|---|---|---|---|---|---|---|---|
| | S | B | Other non-ionic | | | | | Type | Particle size, angstroms | |
| | | | Kind | Amt. | Kind | percent | | | | |
| 15 | 50 | 45 | | | MMM | 5 | 2,050 | I | 2,100 | |
| 16 | 60 | 36 | | | MMM | 4.0 | 2,100 | I | 2,150 | |
| 17 | 49 | 38.5 | | | MMM | 12.5 | 2,600 | I | 2,650 | |
| 18 | 40 | 55 | | | MEM | 5 | 2,360 | II | 2,950 | |
| 19 | 56 | 39 | | | MMM | 5 | 2,160 | I | 2,250 | |
| 20 | 56 | 39 | | | MPM | 5 | 2,480 | III | (¹) | |
| 20c* | 56 | 39 | | | MBM | 5 | 2,550 | None | | |
| 21 | 56 | 39 | | | MMI | 5 | 2,350 | I | 2,350 | |
| 22 | | 39 | MMA | 56 | MMM | 5 | 3,000 | I | 3,000 | |
| 23 | 30 | 35 | BA | 30 | MMM | 5 | 1,840 | I | 1,850 | |
| 23c* | 30 | | BA | 65 | MMM | 5 | 2,350 | None | | |
| 24 | 40 | | ISP | 55 | MMM | 5 | 2,450 | I | 2,550 | |
| 25 | 10 | 45 | VeCl₂ | 40 | MMM | 5 | 1,650 | I | 1,700 | Polymerized at 70° |

¹ Too large to measure with Brice-Phoenix instrument.
* Not examples of the invention.

LIST OF ABBREVIATIONS FOR TABLES I, II AND III

S=Styrene
B=Butadiene
VeCl₂=Vinylidene chloride
MA=Methyl acrylate
VAc=Vinyl acetate
EA=Ethyl acrylate
VCl=Vinyl chloride
ISP=Isoprene 2. The latex of Claim 1 in which the α,β-ethylenically unsaturated carboxylic acid comprises from about 3 percent to about 5 percent of the copolymer.

3. The latex composition of Claim 1 in which the copolymer contains from about 20 percent to about 97.5 percent of a polymerized aliphatic conjugated diene.

4. The latex composition of Claim 3 in which the aliphatic conjugated diene is butadiene.

5. The latex composition of Claim 3 in which the copolymer contains a polymerized alkenyl aromatic compound.

6. The latex composition of Claim 5 in which the alkenyl aromatic compound is styrene.

7. The latex composition of Claim 1 in which the copolymer contains from about 30 percent to about 60 percent of an aliphatic conjugated diene.

8. The latex composition of Claim 1 in which the copolymer is present as particles having an average diameter of from about 1500 Angstroms to about 4000 Angstroms.

9. The latex composition of Claim 1 in which the polymerizable, essentially water-insoluble monomeric composition comprises an acrylic ester.

10. The latex composition of Claim 1 in which the polymerizable, essentially water-insoluble monomeric composition comprises vinylidene chloride.

11. The latex composition of Claim 1 in which the polymerizable, essentially water-insoluble monomeric composition comprises vinyl acetate.

12. The latex composition of Claim 1 in which the amount of carbocyclic compound is from about 2 parts to about 8 parts for each 100 parts of copolymer.

13. The latex composition of Claim 1 in which the carbocyclic compound is a phthalic acid.

14. The latex composition of Claim 1 in which the carbocyclic compound is a 1,2,3,6 - tetrahydrophthalic acid.

15. The latex composition of Claim 1 in which the carbocyclic compound is a hexahydrophthalic acid.

16. A dried film obtained from the latex composition of Claim 1.

17. A dried powder obtained from the latex composition of Claim 1.

18. A water-insoluble polymeric composition which in the dry state is dispersible in water to form a latex having a particle size of from about 500 Angstroms to about 10,000 Angstroms comprising a mixture of a copolymer of from about 1 percent to about 10 percent of an α,β-ethylenically unsaturated carboxylic acid and from about 90 percent to about 99 percent of an essentially water-insoluble, ethylenically unsaturated monomeric composition and a six-membered carbocyclic compound having vicinal carboxyl substituents in an amount sufficient to provide water-dispersibility; said carbocyclic compound being soluble in aqueous alkaline media and said copolymer being film-forming at temperatures below about 95° C.

19. The polymeric composition of Claim 18 which is in the form of a film.

20. The polymeric composition of Claim 18 which is in the form of a powder.

References Cited

UNITED STATES PATENTS

| 3,409,578 | 11/1968 | Hiva | 260—29.6 |
| 3,232,899 | 2/1966 | Guziak | 260—29.6 |
| 3,092,600 | 6/1963 | Ozawa, et al. | 260—29.6 |

WILLIAM SHORT, Primary Examiner

P. F. KULKOSKI, Assistant Examiner

U.S. Cl. X.R.

260—29.7 H, 29.6 TA

UNITED STATES PATENT OFFICE
CERTIFICATE OF CORRECTION

Patent No. 3,822,230     Dated July 2, 1974

Inventor(s) Alfred R. Nelson

It is certified that error appears in the above-identified patent and that said Letters Patent are hereby corrected as shown below:

Column 3, line 61, the word "water-solu-" should be -- water-insol- --.

Column 6, line 34, the word "monethyl" should be --monoethyl--.

Column 6, line 52, the word "its" should be --it--.

Column 7, line 18, delete the words "of the invention in the dry state such as an additive" and insert the words --are not heated above 95°C the disposal problem is--.

Column 7, line 19, the word "redisperible" should be --redispersible--.

Column 9, line 25, the word "terthydrophthalic" should be --tertrahydrophthalic--.

Signed and sealed this 15th day of October 1974.

(SEAL)
Attest:

McCOY M. GIBSON JR.
Attesting Officer

C. MARSHALL DANN
Commissioner of Patents

UNITED STATES PATENT OFFICE
CERTIFICATE OF CORRECTION

Patent No. 3,822,230      Dated July 2, 1974

Inventor(s) Alfred R. Nelson

It is certified that error appears in the above-identified patent and that said Letters Patent are hereby corrected as shown below:

Column 10, line 72, the hyphenated portion of a word "boxylic" should be --bocyclic--.

Signed and sealed this 18th day of February 1975.

(SEAL)
Attest:

RUTH C. MASON
Attesting Officer

C. MARSHALL DANN
Commissioner of Patents
and Trademarks